United States Patent
Line et al.

(10) Patent No.: US 9,821,688 B2
(45) Date of Patent: Nov. 21, 2017

(54) REAR SEAT CUSHION WITH H-POINT ARTICULATION

(71) Applicant: Ford Global Technologies, LLC, Dearborn, MI (US)

(72) Inventors: Johnathan Andrew Line, Northville, MI (US); Robert Damerow, Garden City, MI (US); Patrick Maloney, Dearborn, MI (US); Sean David Fannin, Taylor, MI (US); Balakrishna Reddy, Farmington, MI (US); Mandeep Singh Sidhu, Canton, MI (US); Christian J. Hosbach, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 14/504,504

(22) Filed: Oct. 2, 2014

(65) Prior Publication Data

US 2016/0096451 A1 Apr. 7, 2016

(51) Int. Cl.
*B60N 2/30* (2006.01)
*B60N 2/18* (2006.01)

(52) U.S. Cl.
CPC ........ *B60N 2/3045* (2013.01); *B60N 2/1832* (2013.01); *B60N 2/1864* (2013.01)

(58) Field of Classification Search
CPC ... B60N 2/3045; B60N 2/1864; B60N 2/1832
USPC .......................................................... 297/337
See application file for complete search history.

(56) References Cited

U.S. PATENT DOCUMENTS

| | | | |
|---|---|---|---|
| 5,509,716 A | 4/1996 | Kolena et al. | |
| 6,030,043 A * | 2/2000 | Habedank | B60N 2/067 297/320 |
| 6,641,214 B2 * | 11/2003 | Veneruso | B60N 2/0232 297/216.15 |
| 7,637,571 B2 * | 12/2009 | Okano | B60N 2/1821 297/341 X |
| 7,780,230 B2 * | 8/2010 | Serber | B60N 2/0745 297/216.1 X |
| 8,641,140 B2 | 2/2014 | Swierczewski | |

FOREIGN PATENT DOCUMENTS

EP 1019693 B1 7/2005

* cited by examiner

*Primary Examiner* — Anthony D Barfield
(74) *Attorney, Agent, or Firm* — Vichit Chea; Price Heneveld LLP (57) ABSTRACT

A vehicle seat assembly includes a fixed mounting plate and a support bar coupled with the mounting plate and slidable with respect thereto along an arcuate path. A cushion support is coupled with the support bar, and a drive mechanism is operably coupled with the cushion support to rotate the cushion support about a center of the arcuate path positioned opposite the rail by sliding of the support bar along the path.

20 Claims, 8 Drawing Sheets

REAR SEAT CUSHION WITH H-POINT ARTICULATION

FIELD OF THE INVENTION

The present invention generally relates to a mounting assembly for a vehicle cushion. Specifically, the mounting assembly can be used to provide articulation of a rear seat cushion approximately about the hip-point of an occupant.

BACKGROUND OF THE INVENTION

Motor vehicles include a number of seats that may be adjustable and are often configured in different manners depending on the location of the seat within the motor vehicle. Rear vehicle seats may be arranged in a bench configuration, with the seats provided thereby, e.g. middle, driver-side, and passenger-side extending generally continuously or contiguously across the vehicle.

In many applications, such rear seats may not be adjustable at all, the cushion and seatback being fixed relative to the floor and the rear wall of the vehicle, respectively. In other applications where rear seats are made adjustable, the cushion may simply slide fore and aft within the vehicle along a limited range or may articulate by raising and lowering of the front and/or back of the cushion, which is often done independently with no regard for the manner in which the cushion moves during such articulation. In this and other modes of cushion adjustment, the movement may vary, sometimes significantly, from the natural movement of the body parts supported by the vehicle seat. Accordingly, such adjustment may result in an uncomfortable positioning of such body parts, requiring adjustment of the occupant's positioning after seat adjustment.

For these and other reasons, further advances in the adjustment of vehicle seats and the mechanisms that provide this adjustment may be desired.

SUMMARY OF THE INVENTION

According to one aspect of the present invention, a vehicle seat assembly includes a fixed mounting plate and a support bar coupled with the mounting plate and slidable with respect thereto along an arcuate path. A cushion support is coupled with the support bar, and a drive mechanism is operably coupled with the cushion support to rotate the cushion support about a center of the arcuate path positioned opposite the rail by sliding of the support bar along the path.

According to another aspect of the present invention, a motor vehicle seat including a platform, a cushion, and a mounting assembly. The mounting assembly has a mounting plate fixed relative to the platform and a support bar slidably coupled with the mounting plate so as to be moveable with respect thereto along an arcuate path such that the cushion is moveable in a reclining motion by rotation thereof about a point spaced above the cushion.

According to another aspect of the present invention, a mounting assembly for a vehicle seat cushion including a mounting plate defining first and second lateral sides. The mounting assembly also includes first and second support bars respectively coupled with the mounting plate on the first and second lateral sides of the mounting plate so as to be slidable along an arcuate path having a center. A cushion support is mounted on the first and second support bars with the center of the path opposite the first and second rods.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
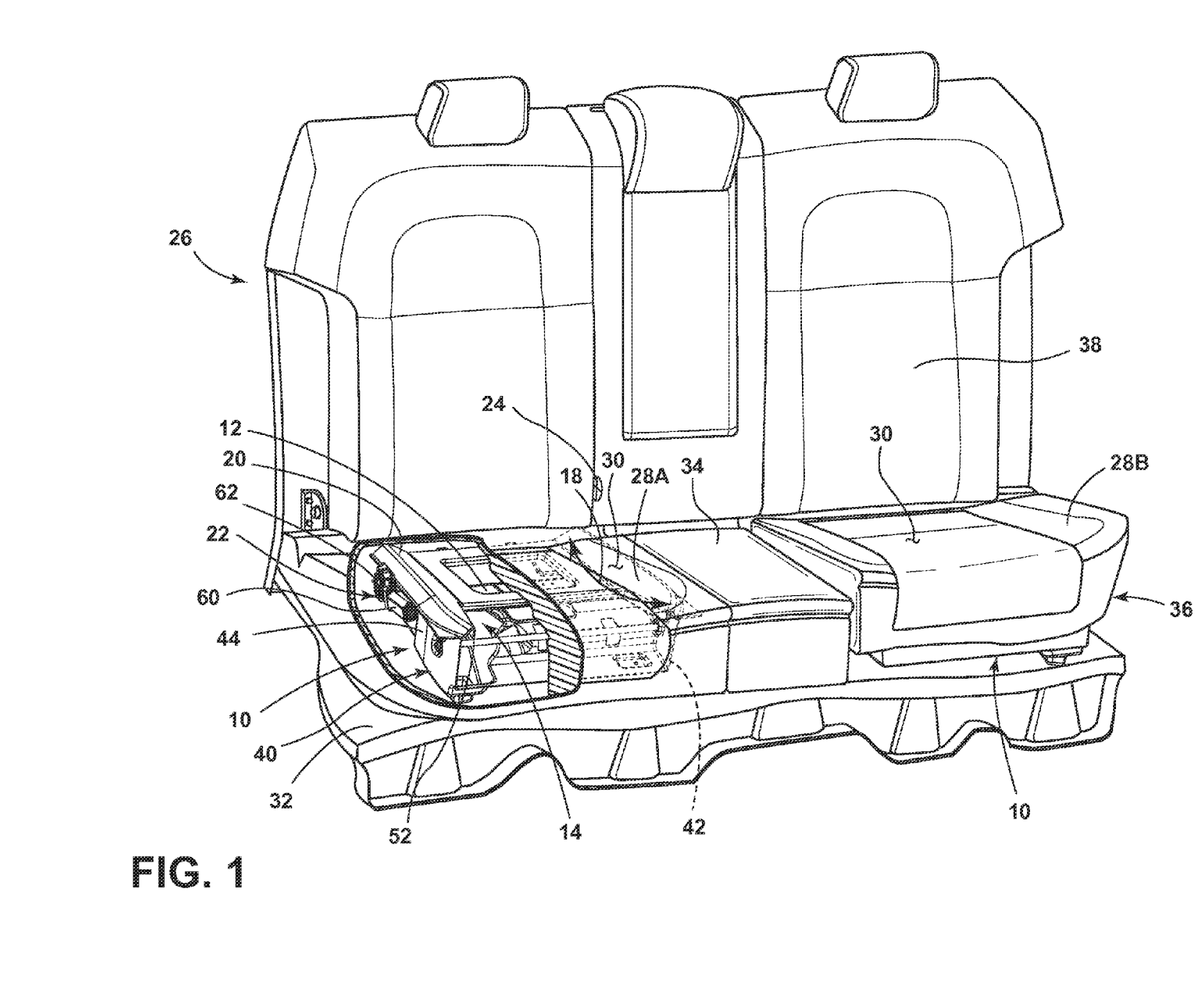
FIG. 1 is a front perspective view of a rear vehicle seat mounted on a portion of the vehicle body, the seat including a cutaway showing a mounting mechanism for the cushion thereof.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seat assembly. The vehicle seat assembly 10 includes a fixed mounting plate 12 a support bar 14, 16 coupled with the mounting plate 12 and slidable with respect thereto and arcuate path 18. Vehicle seat assembly 10 further includes a cushion support in the form of a seat pan 20 coupled with the support bar 14, 16. A drive mechanism 22 is operably coupled with the seat pan 20 to rotate the seat pan 20 about the center 24 of the arcuate path 18 positioned opposite the support bar 14 or 16 by sliding of the support bar 14 or 16 along the arcuate path 18.

As shown in FIG. 1, the vehicle seat assembly 10 can be in the form of a mounting assembly useable in connection with a motor vehicle seat, such as a rear bench seat 26 of the type often found in automobiles, including sedans or the like. As illustrated, assembly 10 can be used to mount one or more seat cushions 28a and 28b. Platform 32 can be a portion of the body of the vehicle (not shown) in which seat 26 is included and can, accordingly be of formed sheet metal or the like. As further illustrated in FIG. 1, individual assemblies 10 may be respectively used to mount separate seat cushions 28a and 28b located on, respectively, the driver side of the associated vehicle (seat cushion 28a) and the passenger side of the associated vehicle (seat cushion 28b). In this manner, the seat cushions 28a and 28b may be independently reclinable, according to a particular motion thereof described further below, by the above-described movement of the seat pan 20. As shown, seat cushions 28a and 28b can be coupled to and generally supported by seat pans 20 of respective assemblies 10 such that movement of the seat pan 20 causes corresponding movement of seat cushion 28a or 28b, including reclining of the associated seat surface 30.

Figure 8:
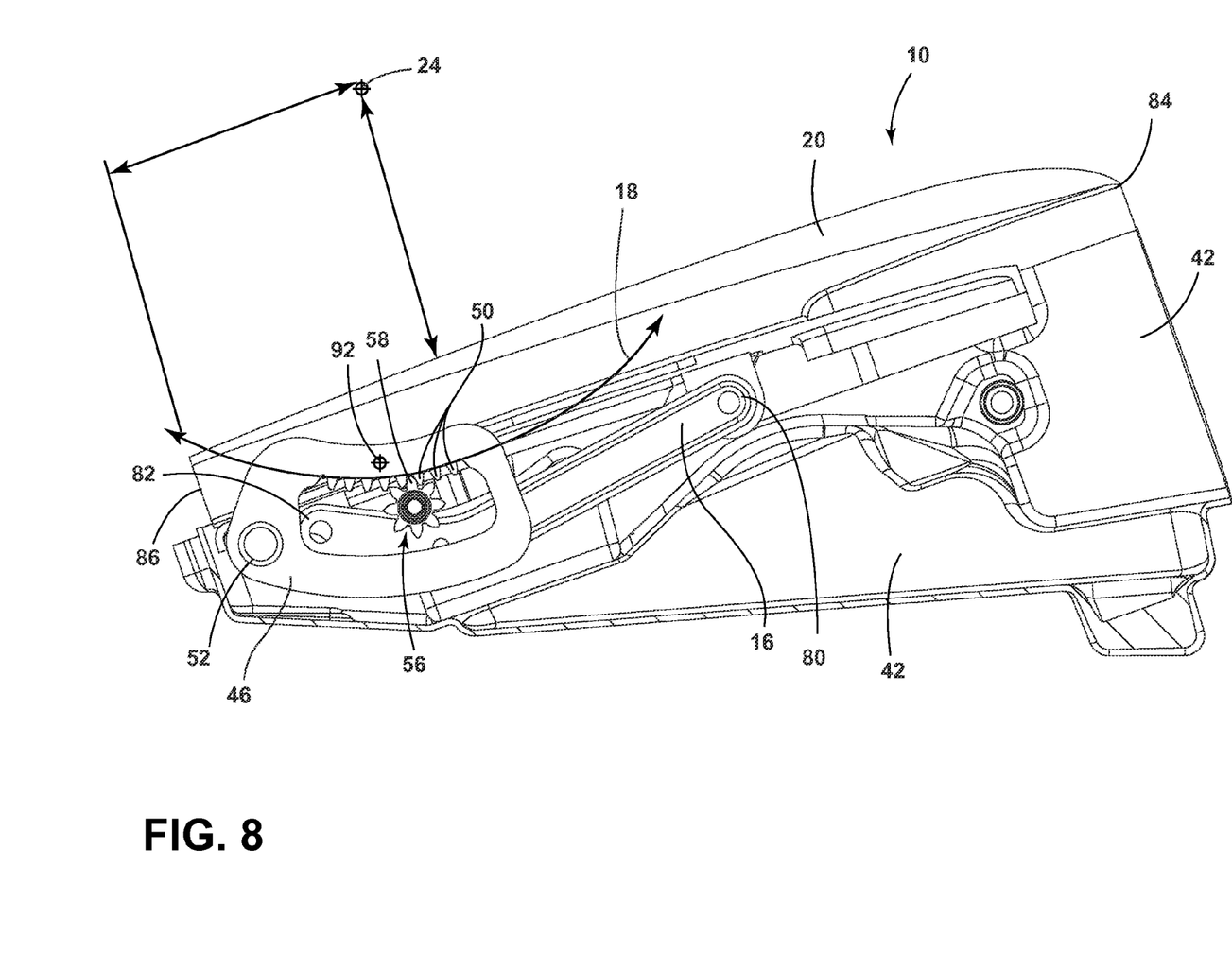
FIG. 8 is a side view of the mounting assembly in a normal position taken along line VIII-VIII in FIG. 7.

Assembly 10 can be used, as shown in FIG. 1, with cushions 28a and 28b included in a vehicle seat 26 that otherwise resembles a rear bench seat for a vehicle, including a middle seat cushion 34 positioned between cushions 28a and 28b, the seating surfaces 30 of each cushion 28a, 28b, and 34 extending generally continuously when all cushions are in the normal position (as cushion 28a in FIG. 1 and as shown in FIG. 8). Middle seat cushion 34 may be stationary or may be moveable by incorporation therewith of an additional assembly, similar to the depicted assemblies 10. Seatback 38 is positioned adjacent cushions 28a, 28b, and 34 so as to extend generally along the width of seat 26. Seatback 38 may also be moveable itself or may be stationary. The use of assembly 10 in connection with cushions 28a and 28b allows each cushion to be adjusted in a reclining motion (discussed further below) independently of each other and independently of the remaining portions of seat 26, including middle seat cushion 34 as well as seatback 38.

Assembly 10 can further include a base 40 that can be positioned on platform 32 and rigidly coupled thereto to affix assembly 10 within the associated vehicle. Mounting plate 12 can be rigidly affixed to base 40 to provide anchoring and support for seat pan 20. Alternatively, mounting plate 12 can be integrated into the structure of base 40, including the various features thereof, discussed further below. Portions of the drive mechanism 22, also discussed further below, can be coupled between base 40 and seat pan 20 to cause the aforementioned movement of seat pan 20 with respect to base 40. As shown in greater detail in FIGS. 2-7, base 40 includes spaced apart side walls 42 and 44 positioned on opposite sides thereof and further positioned to surround mounting plate 12 and support bars 14, 16 to conceal various moveable components of assembly 10, and to provide additional support and rigidity for assembly 10.

As further shown in FIGS. 2-7 drive mechanism 22 includes a gear rack 46 defining an elongate slot 48 therein with a plurality of teeth 50 arranged along a portion of slot 48 and extending in an arcuate manner generally concentric with path 18. A connecting rod 52 is rigidly coupled with gear rack 46, such as by welding therewith, and extends across a width of base 40. Connecting rod 52 is further received within a slot 54 present along sidewall 42 along base 40. As shown, slot 54 can extend along path 18 or can be otherwise concentric with path 18 about center 24. Drive mechanism 22 further includes a pinion 56 that is rotatably coupled with side wall 44 of base 40. Pinion 56 includes a plurality of teeth 58 which are operably engaged in a mesh relationship with teeth 50 of gear rack 46. In this manner, pinion 56 can be driven in rotational motion to cause movement of gear rack 46 thereover.

Figure 10:
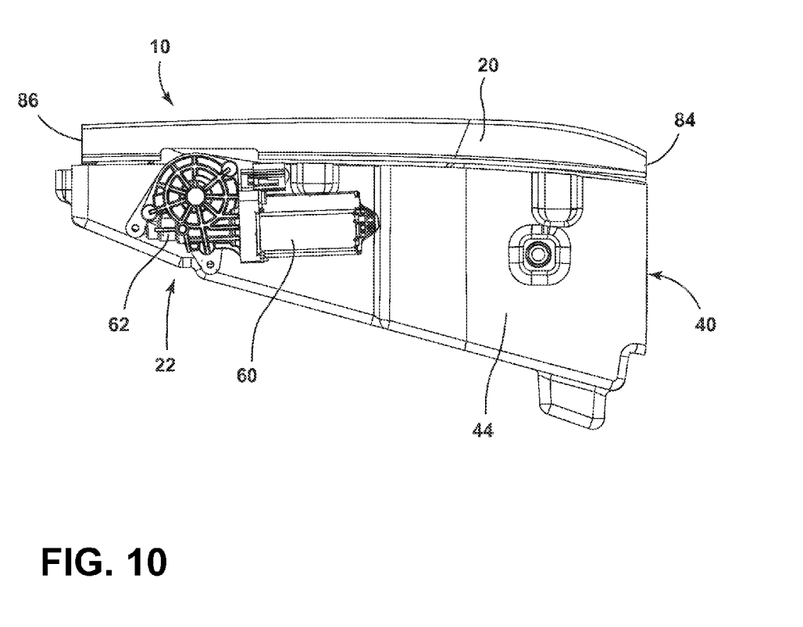
FIG. 10 is a side elevation view of the mounting assembly.

A motor 60 can be included in drive mechanism 22 to cause rotation of pinion 56. As shown in FIG. 10, motor 60 can be mounted to base 40, such as along an outside surface of sidewall 44, and can be operably coupled with pinion 56 by a reduction unit 62, which itself can be mounted on side wall 44 by rigid coupling therewith. Accordingly, coupling of pinion 56 with an output end of reduction unit 62 can serve to mount pinion 56 in a generally fixed location along an interior of side wall 44, while allowing motor 60 to cause rotational motion of pinion 56 within such location. In an embodiment, motor 60 can be a 12-volt, direct current ("DC") motor, although other suitable motors can also be used. Reduction unit 62 can include a plurality of internal gears operably engaged with each other and configured to change the output direction of motor 60 so as to be aligned with the positioning of pinion 56 and/or to provide appropriate adjustment to the operational speed or torque with which motor 60 operates.

Figure 2:
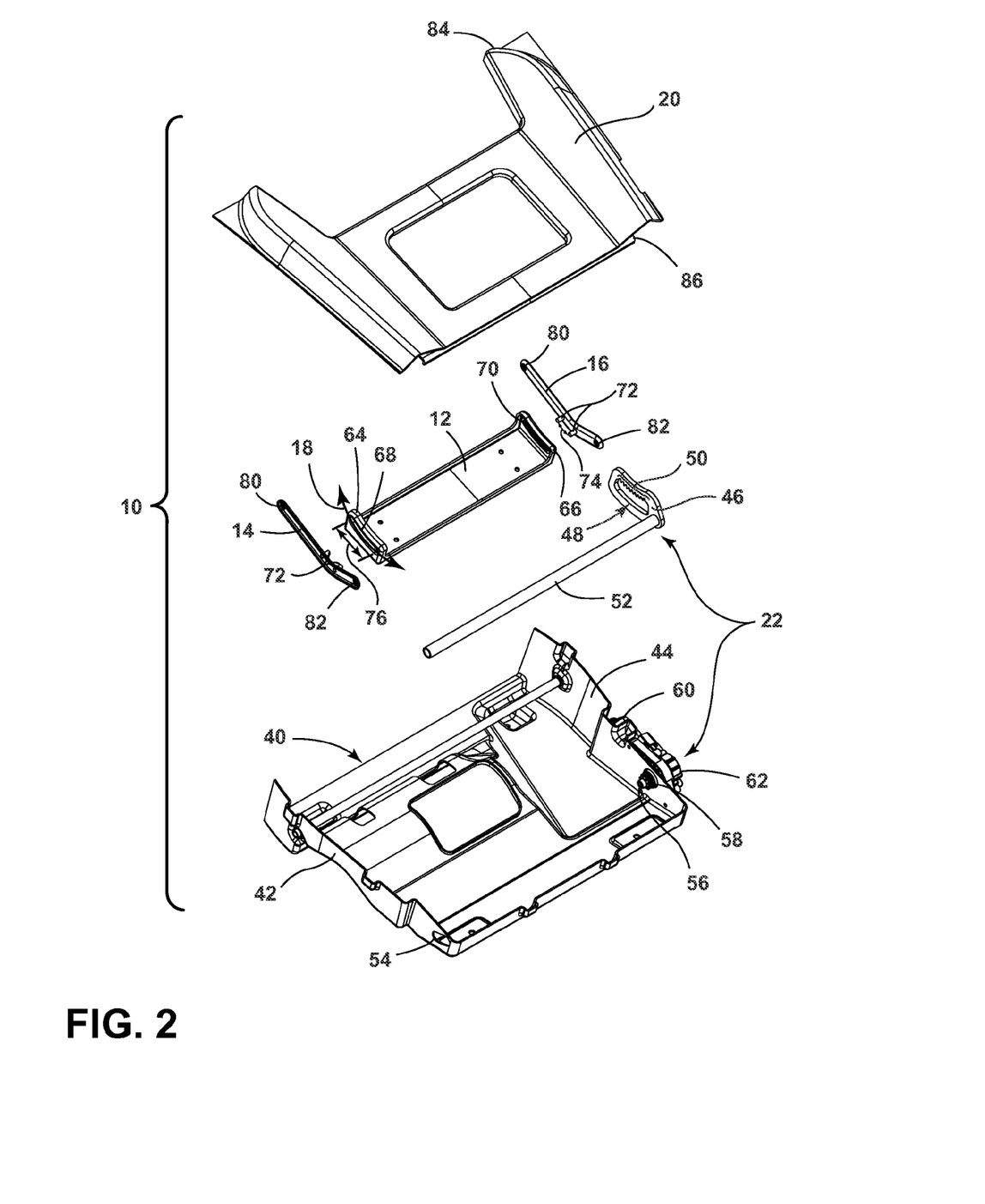
FIG. 2 is an exploded perspective view of the mounting assembly of FIG. 1.
Figure 3:
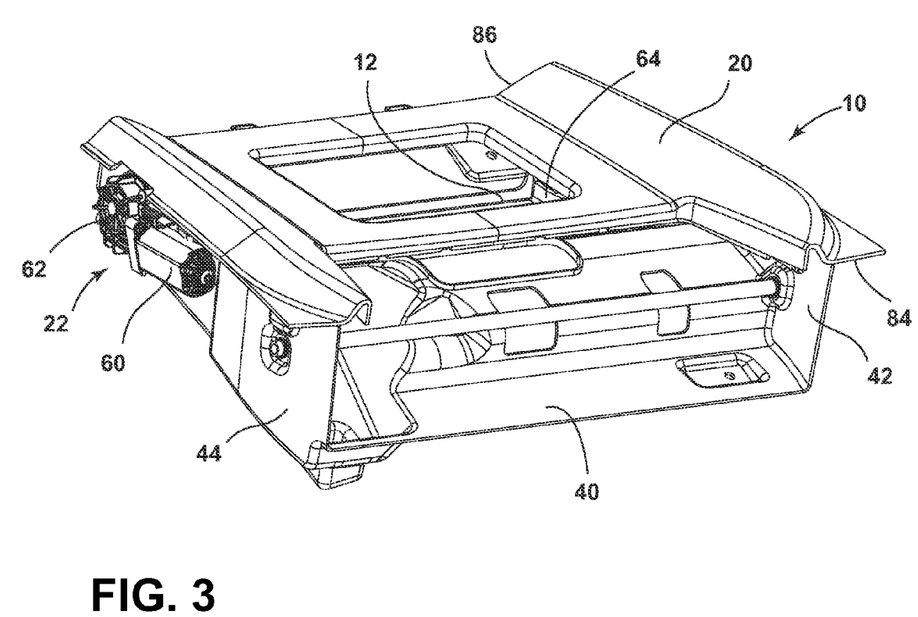
FIG. 3 is a front-right side perspective view of the mounting assembly.
Figure 4:
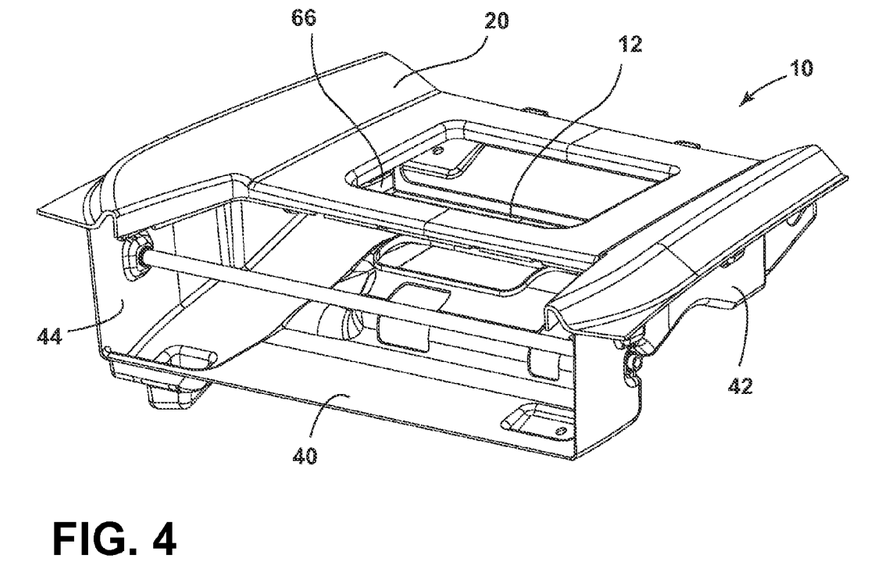
FIG. 4 is a front-left side perspective view of the mounting assembly.
Figure 5:
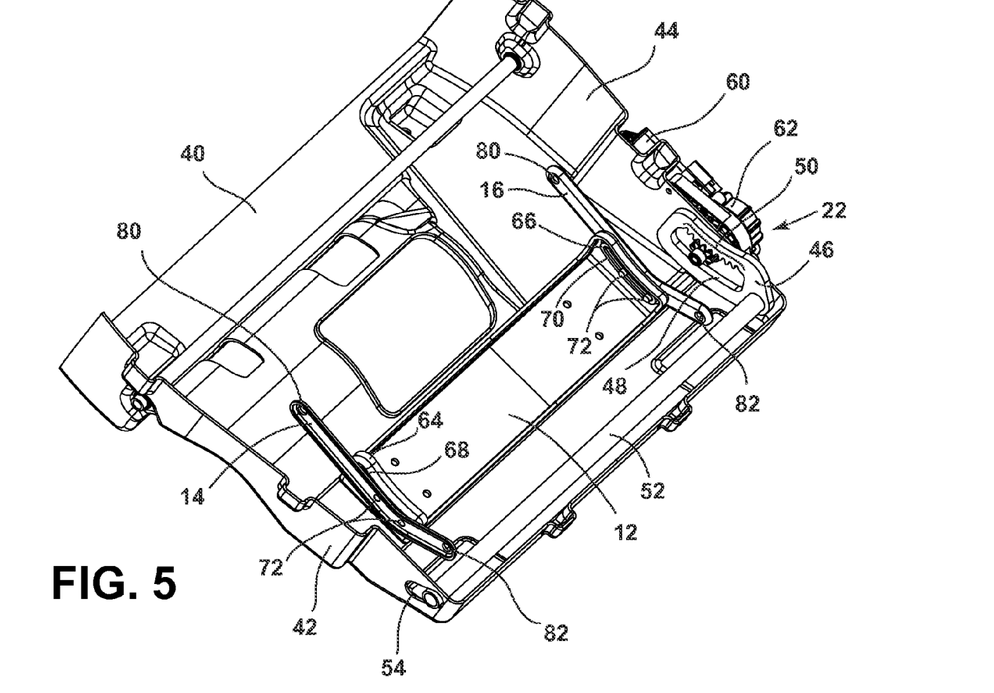
FIG. 5 is a partial view of the mounting assembly showing various components thereof.
Figure 6:
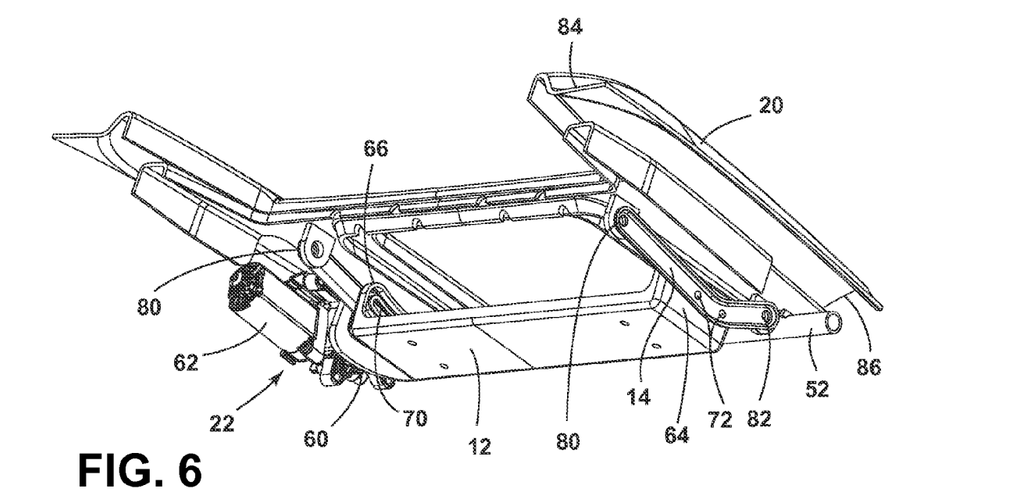
FIG. 6 is an alternative partial view of the mounting assembly showing further components thereof.
Figure 7:
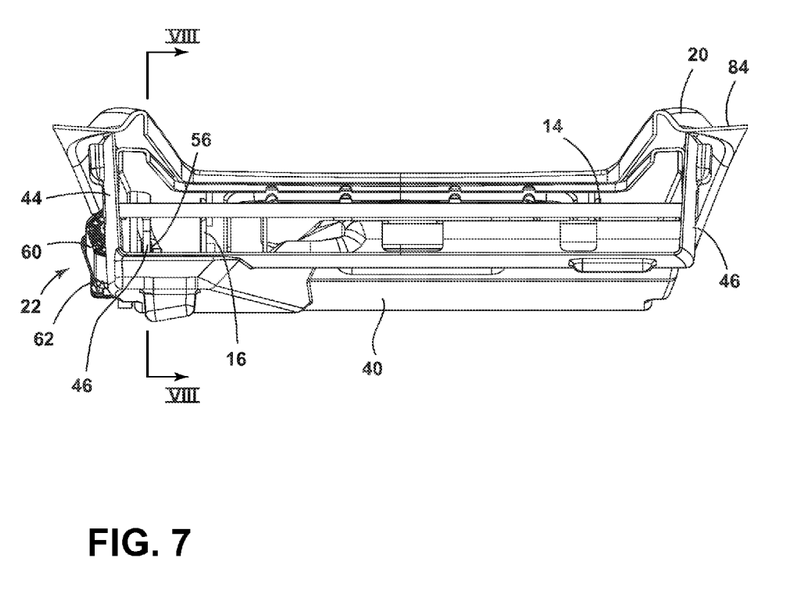
FIG. 7 is a front elevation view of the mounting assembly.

As shown in FIG. 5, mounting plate 12 includes flanges 64 and 66 spaced apart from each other on opposite sides of mounting plate 12. Each of flanges 64 and 66 includes a respective track 68, 70 therein that defines arcuate path 18. Both tracks 68 and 70 are identical in shape and both define identical arcuate paths 18 that are coaxial with each other about center 24. Support bars 14 and 16 are respectively slidably coupled with mounting plate 12 by coupling thereof respectively with tracks 68 and 70. As illustrated in FIGS. 2, 5 and 6, each support bar 14 and 16 can include a respective pair of pegs 72 rigidly coupled therewith and receivable within respective tracks 68 and 70 to help slidably coupled support bars 14 and 16 respectively with mounting plate 12.

Referring again to FIG. 5, pegs 72 can be spaced apart in the respective pairs thereof at a distance 74 so as to provide stability for support bars 14, 16 and to constrain the sliding movement of support bars 14, 16 to the rotational motion about center 24 prescribed by respective tracks 68 and 70. The distance 74 between respective pegs 72 can further serve to establish a range of motion for support bars 14, 16 with respect to mounting plate 12. Specifically, tracks 68 and 70 can have an length 76 representing a segment of path 18 along which tracks 68 and 70 extend, and the distance 74 between pegs 72 can be less than the associated track length 76 by the desired range of motion for support bars 14, 16. To the extent that the desired range of motion for support bars 14, 16 with respect to mounting plate 12 is influenced by the desired angular rotation of seat surface 30 about point 24, discussed further below, the differential between track length 76 and the distance 74 between pegs 72 can be determined based on such desired seat surface 30 rotation by configuring such length differential to result in rotation of support bars 14,16 by the desired range of angular rotation for seat surface 30. In an embodiment, tracks 68 and 70 can have a length 76 of between about 5 and 10 cm, and in one embodiment about 7 cm. Similarly, the distance 74 between pegs 72 can correspond with track length 76 and can be between about 4 cm and about 8 cm and in one embodiment about 5 cm. Stated differently, the differential between track length 76 and distance 74 can be between about 4 cm and 6 cm, and in embodiment about 4 cm. Path 18 and, accordingly, tracks 68 and 70 can have a radius between about 10 and 15 cm and in one embodiment about 14 cm, such that the length of travel provided by the differential between track length 76 and peg distance 74 is between about 4 degrees and 10 degrees and in one embodiment about 6 degrees.

As shown in FIG. 6, support bars 14, 16 can be rigidly coupled with seat pan 20 along opposite sides thereof, such that support bars 14, 16 support seat pan 20 with respect to mounting plate 12, thusly guiding the aforementioned rotational movement of seat pan 20 about point 24. Support bars 14, 16 can be rigid, elongate members extending between respective front ends and 80 and back ends 82 to couple with respective portions of seat pan 20 proximate the front end 84 and back end 86 thereof. Such coupling can be accomplished using mechanical fasteners such as bolts, rivets, snap fasteners or the like or can be accomplished using adhesives or the like, for example. The front 80 and back 82 ends of support bars 14, 16 are preferably spaced apart by a distance sufficient to provide support for seat pan 20 such that seat pan 20 is appropriately positioned to correspond with the position of support bars 14, 16 with respect to mounting plate 12, including under the weight of an occupant of vehicle seat 26 on the associated cushion 28a or 28b. Support bars 14, 16 can be bent so as to depend generally downwardly from seat pan 20 to achieve appropriate spacing for seat pan 20 above mounting plate 12.

In an example, the support bars 14, 16 are coupled with seat pan 20 on respective opposite sides of mounting plate 12 and are positioned so as to be outside of the respective flanges 64 and 66 positioned on each end thereof. By being positioned as such and with pegs 72 extending inwardly from the respective support bars 14, 16, such arrangement alone may maintain pegs 72 within the respective tracks 68 and 70 so as to maintain the support bars 14,16 in coupled relationship with mounting plate 12. In other arrangements, pegs 72 themselves may couple with the respective tracks 68 and 70 of mounting plate 12 to achieve coupling of support bars 14, 16 with mounting plate 12.

Support bars 14, 16, as well as mounting plate 12 can be made of metal or sufficiently rigid plastic materials. Examples of such materials include various types of steel, various aluminum or magnesium alloys, as well as various plastics or composite plastics. Such materials may generally be rigid enough to provide adequate support for seat pan 20, while not being so brittle as to crack or break during movement of the various components of assembly 10, or during movement of the associated vehicle itself.

As further shown in the partial view of assembly 10 in FIG. 6, connecting rod 52 is coupled with seat pan 20 adjacent the back end 86 thereof to couple gear rack 46 therewith. The coupling of connecting rod 52 with seat pan 20 further provides support for seat pan 20 with respect to side wall 42 by the positioning of the adjacent end of connecting rod 52 within slot 54, as described above and shown in FIG. 5. The coupling of connecting rod 52 with seat pan 20, as shown in FIG. 6, along with the corresponding engagement of gear rack 46 of pinion 56, shown in FIG. 5, is such that the rotation of pinion 56 and the resulting translation of gear rack 46 with respect thereto, cause a corresponding movement of seat pan 20. The arrangement of teeth 50 of gear rack 46 to extend concentrically with articulation path 18 is such that the rotational force applied to gear rack 46 by pinion 56 drives rotation of seat pan 20 about point 24, as guided by movement of support bars 14, 16 along tracks 68 and 70 (i.e. along articulation path 18).

In an embodiment, motor 60 and/or reduction unit 62 can be configured to be generally fixable (such as by internal forces of the motor 60 when unpowered) to retain pinion 56 in a particular rotational position when motor 60 is not in operation such that assembly 10 can maintain seat pan 20, and accordingly a respective one of cushions 28a and 28b in a selected rotational position about point 24, in addition to providing for the above-described rotational, reclining movement of cushions 28a and 28b. Motor 60 can be connected with a control (not shown) which may include one or more user inputs to control the rotation of pinion 56 to drive the desired movement of cushions 28a or 28b based on the desired positioning of the user. Such inputs can include a "recline" input and "decline" input, for example, which can cause respective rotation of pinion 56 in different directions appropriate to cause movement of cushion 28a or 28b in either a reclining movement (i.e. in which front 84 of seat pan 20 moves upward in a vertical direction, while rear 86 of seat pan 20 moves downward in a vertical direction) or a declining direction (i.e. in which front end 84 of seat pan moves in a vertically downward direction). In a further embodiment, such inputs can also control the speed with which pinion 56 turns so as to control the speed of the inclining or declining of cushion 28a or 28b.

In use of the seat mounting assembly 10, the respective cushion 28a or 28b rotates relative to base 40 about point 24, which, as shown in FIG. 8, is positioned on a side of seat pan 20 opposite support bars 14, 16. In other words, point 24 is positioned vertically above seat surface 30. Further, assembly 10 is arranged with respect vehicle seat 26 including seatback 38 such that point 24 is positioned horizontally forward of seatback 38. Such positioning of point 24 results in cushions 28a and 28b rotating approximately about a hip-point of a passenger seated in the vehicle seat 26 on the corresponding cushion 28a or 28b. In general, a passenger seated as such typically has legs and a pelvis supported by cushion 28a or 28b on the respective seat pan 20 of assembly 10. In accordance with the variation and potential leg and pelvis size and position of the seated passenger, the location of point 24 is positioned so as to align with a generally-estimated hip rotation point for a majority of potential passengers of the associated vehicle. More specifically, point 24 is positioned in a general area that is at least close to where the passenger's pelvis will likely connect with the passenger's legs. In addition, the seated passenger's back is supported by the seatback 38, which is also shaped to correspond to that of a majority of passengers. Accordingly, the hip point of the seated passenger is positioned above the seat surface 30 and forward of seatback 38.

Figure 9:
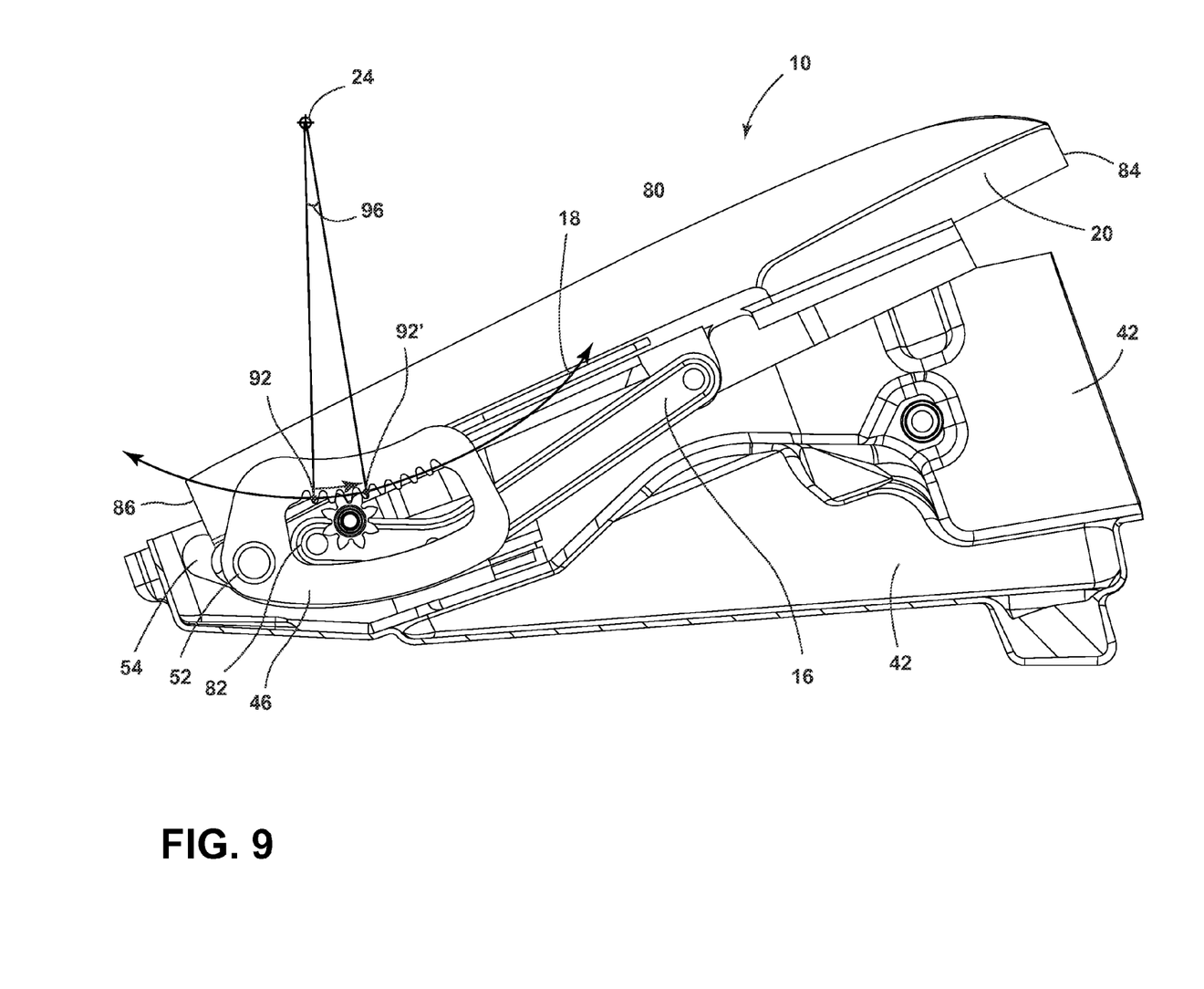
FIG. 9 is a side view of the cross-section of the mounting assembly of FIG. 8 in a reclined position.

As shown in FIGS. 8 and 9, assembly 10 is configured to move seat pan 20, and accordingly, cushion 28a or 28b (referred to generally as cushion 28 with respect to FIGS. 8 and 9) along articulation path 18. As illustrated, articulation path 18 is in the form of a radial, arcuate path about center point 24 that is positioned generally on a side of seat pan 20 vertically opposite both support bars 14, 16. Accordingly, although articulation path 18 is illustrated along tracks 68 and 70 of mounting plate 12, additional articulation paths could be defined for seat pan 20 and/or cushion 28 with reference to additional features of assembly 10 showing similar movement about point 24 and concentric with articulation path 18. FIG. 8 further shows a reference point 92 positioned along gear rack 46 at approximately a midpoint thereof.

As shown in FIG. 9, articulation of seat pan 20 about point 24 is achieved by movement of gear rack 46 along the arc defined by the associated teeth 50, as driven by rotation of pinion 56 by motor 60. Such movement of gear rack 46 is illustrated by the relative positions shown for reference point 92' in FIG. 9, with reference to the original location of reference point 92. As shown in FIG. 9, articulation of seat pan 20 includes movement of gear rack 46 along in direction 94. Such movement reflects rotation of gear rack 46 about point 24 through an angle 96, which can be through approximately 2° to about 10°, and in one embodiment approximately 6°. The distance of travel by such rotation can be between about 2 cm and about 12 cm, and in one embodiment about 3 cm.

The angle 96 through which gear rack 46 is described as rotating about point 24 can also reflect the angle through which seat pan 20 rotates about point 24. Accordingly, the movement of gear rack 46 with respect to pinion 56 can control the articulation of seat pan 20, and accordingly, the respective cushion 28a or 28b achieved by assembly 10. Accordingly, and as noted above, support bars 14,16 can provide for support of seat pan 20 with respect to base 40, while helping to guide movement of seat pan 20, as described above by sliding thereof along path 18. The movement of seat pan 20 depicted between FIGS. 8 and 9 is in the above-described reclining motion and is, generally, such that front 84 of seat pan 20 moves generally upward through a distance of between about 5 cm and 7 cm. Similarly, the rear 54 of seat pan 20 moves generally downwardly during the reclining motion through a corresponding distance of between 0.5 cm and about 3 cm. Movement of seat pan 20 in the declining motion (i.e. back to the normal position shown in FIG. 8 is essentially reversed and is through the same respective distances as the reclining motion. Such movement may be influenced generally, by the positioning of support bars 14, 16 with respect to seat pan 20 and the corresponding coupling between support bars 14, 16 and mounting plate 12. In one embodiment, support bars 14, 16 are coupled with seat pan 20 and further shaped such that, when in the normal position (FIG. 8) mounting plate 12 is positioned closer to rear side 86 of seat pan 20 than to the front side 84 thereof. In one example, mounting plate 12 can be positioned within about 10% and 40% of a total distance between rear 86 and front 84 of seat pan 20.

Upon translation between the normal position (FIG. 8) and the reclined position (FIG. 9), seat pan 20 pivots about point 24, and thusly, about an approximate location of the hip point of an occupant of the associated vehicle seat 26 on the corresponding cushion 28a or 28b. Rotational movement of cushion 28a or 28b about point 24, generally aligned with the occupant's hip point substantially reduces the longitudinal movement between seat surface 30 and the passenger's legs and/or may also reduce longitudinal movement between seatback 38 and the occupant's back. Either of such movements can commonly move passenger's clothing up or down relative to the passenger's back or legs. Accordingly, rotational movement of cushion 28a or 28b about point 24 will generally maintain consistent support of the passenger's legs, substantially reducing the frequency of adjusting the passenger's seated position forward or rearward on cushion 28a or 28b. It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:
1. A vehicle seat assembly, comprising:
   a fixed mounting plate including an arcuate track;
   a support bar coupled with the mounting plate and slideable with respect thereto along a path defined by the track;
   a cushion support coupled with the support bar; and
   a drive mechanism operably coupled with the cushion support to rotate the cushion support about a center of the path positioned opposite the track by sliding of the support bar along the track, the drive mechanism including a gear rack rigidly coupled with the cushion support and a pinion in a fixed location relative to the mounting plate, the pinion operably engaged with the sear rack to drive a rotation of the cushion support.
2. The seat assembly of claim 1, wherein:
   the support bar includes a pair of pegs coupled therewith; and
   the coupling of the mounting plate with the support bar includes slideable coupling of the pair of pegs with the track.
3. The seat assembly of claim 2, wherein:
   the mounting plate is coupled with the support bar and is slidable with respect thereto in the path by the slidable coupling of the pair of pegs along the track.
4. The seat assembly of claim 2, wherein the support bar extends to first and second ends spaced apart at a distance longer than a length of the track.
5. The seat assembly of claim 1, wherein:
   the support bar is a first support bar and the track is a first track;

the mounting plate further defines a second track, the first support bar being coupled with the mounting plate by slidable coupling with the first track; and the assembly further includes a second support bar coupled with the mounting plate by slidable coupling with the second track.

6. The seat assembly of claim 1, further including a base, the mounting plate being fixed relative to the base.

7. The seat assembly of claim 1, further including a cushion coupled with and supported by the cushion support such that rotation of the cushion support about the center of the path causes a corresponding rotation of the cushion.

8. The seat assembly of claim 7, wherein:
the cushion defines a rear side and a seating surface; and
the center of the path is positioned vertically above the seat surface and forward of the rear side of the cushion.

9. The seat assembly of claim 1, wherein the center of the path is generally alignable with the hip rotation point of an occupant.

10. The seat assembly of claim 1, wherein the gear rack defines an arcuate path having a center aligned with a center of a path defined by the arcuate track.

11. A motor vehicle seat, comprising:
a platform;
a cushion;
a mounting assembly, including:
    a mounting plate fixed relative to the platform and defining an arcuate track; and
    a support bar including a pair of pins slidably coupled with the arcuate track such that the cushion is moveable along an arcuate path defined by the arcuate track in a reclining motion including rotation thereof about a point spaced above the cushion;
a cushion support to which the cushion is coupled and a base coupled with the platform, the cushion support being coupled with the support bar, and the mounting plate being coupled with the base; and
a drive mechanism coupled between the platform and the cushion and operable to move the cushion with respect to the platform in the reclining motion, the drive mechanism having a gear rack rigidly coupled with the cushion support and a pinion coupled with the base, the pinion operably engaged with the gear rack to drive the reclining motion of the cushion.

12. The motor vehicle seat of claim 11, wherein the drive mechanism is fixable to retain a selected position of the cushion with respect to the base.

13. The motor vehicle seat of claim 11, wherein the point about which the cushion rotates is alignable with the hip rotation point of an occupant.

14. The motor vehicle seat of claim 11:
further including a seatback positioned adjacent the cushion;
wherein the cushion is independently movable with respect to the seatback.

15. The motor vehicle seat of claim 11, wherein the gear rack defines an arcuate path having a center aligned with a center of a path defined by the arcuate track.

16. A mounting assembly for a vehicle seat cushion, comprising:
a mounting plate defining first and second exterior lateral faces;
first and second support bars respectively coupled with the mounting plate on the first and second exterior lateral faces thereof so as to be slidable along an arcuate path having a center;
a cushion support mounted on the first and second support bars with the center of the path opposite the first and second support bars; and
a drive mechanism coupled with the cushion support and operable to cause reclining movement of the cushion support about the center of the arcuate path by sliding of the first and second rods with respect to the mounting plate, the drive mechanism having a gear rack rigidly coupled with the cushion support and a pinion coupled with the base, the pinion operably engaged with the gear rack to drive the reclining motion of the cushion.

17. The mounting assembly of claim 16, wherein:
the first and second support bars each include a pair of pegs coupled therewith; and
the mounting plate includes first and second tracks defined respectively on the first and second exterior lateral faces thereof, the coupling of the support bars with the mounting plate including respective slidable coupling of the pairs of pegs with the tracks.

18. The mounting assembly of claim 17, wherein:
the tracks each define the arcuate path; and
the support bars are coupled with the mounting plate and are slidable with respect thereto along the arcuate path by the slidable coupling of the pairs of pegs along the tracks.

19. The mounting assembly of claim 16, wherein the center of the arcuate path is positioned to align with the hip rotation point of an occupant.

20. The mounting assembly of claim 16, wherein the gear rack defines an arcuate path having a center aligned with a center of a path defined by the arcuate track.

* * * * *

UNITED STATES PATENT AND TRADEMARK OFFICE
CERTIFICATE OF CORRECTION

| | |
|---|---|
| PATENT NO. | : 9,821,688 B2 |
| APPLICATION NO. | : 14/504504 |
| DATED | : November 21, 2017 |
| INVENTOR(S) | : Line et al. |

It is certified that error appears in the above-identified patent and that said Letters Patent is hereby corrected as shown below:

In the Claims

Column 8:
Claim 1, Line 51;
"sear" should be --gear--.

Signed and Sealed this
First Day of May, 2018

Andrei Iancu
*Director of the United States Patent and Trademark Office*